United States Patent Office 3,634,471
Patented Jan. 11, 1972

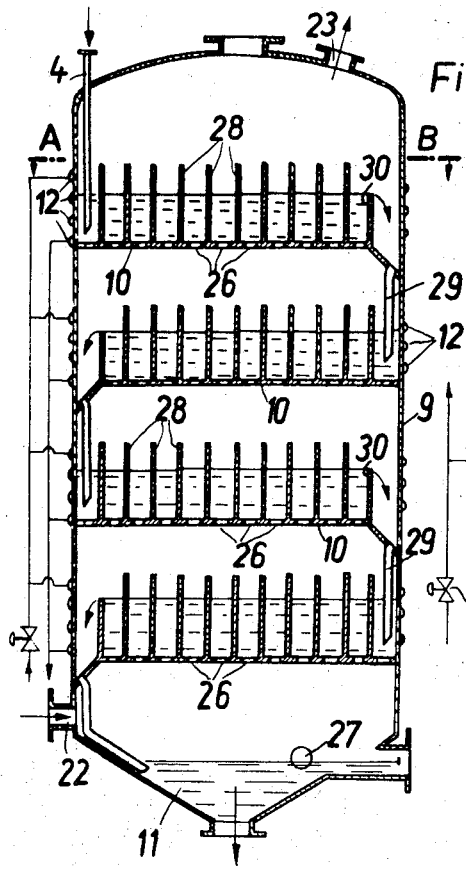
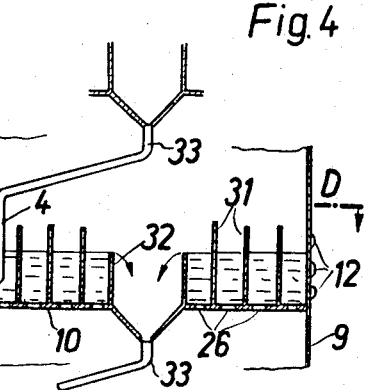
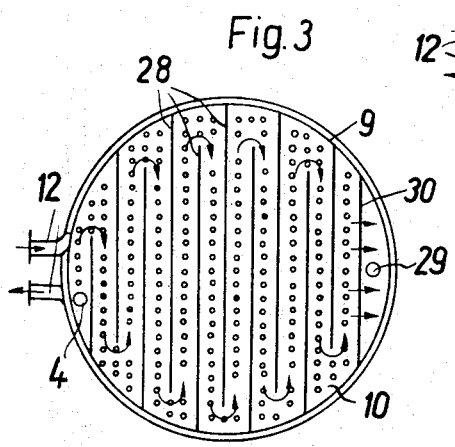
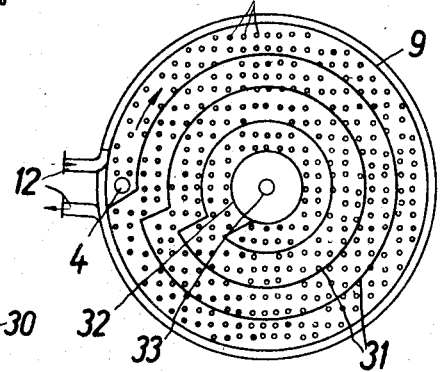

3,634,471
METHOD FOR THE CONTINUOUS HYDROGENATION OF OILS AND FATS
Wolfgang Kehse, Berlin, Germany, assignor to Fried. Krupp G.m.b.H., Essen, Germany
Original application Feb. 1, 1966, Ser. No. 524,261, now Patent No. 3,497,327, dated Feb. 24, 1970. Divided and this application Aug. 13, 1968, Ser. No. 752,370
Int. Cl. C11c 3/12
U.S. Cl. 260—409        5 Claims

ABSTRACT OF THE DISCLOSURE

A flowable mass, for instance an oil or a fat in flowable condition, is reacted with a gas capable of reacting with such flowable mass, for instance with hydrogen gas capable of hydrogenating such flowable mass, by passing the flowable mass along tortuous paths along the upper faces of a series of vertically spaced substantially horizontally extending perforated plates, and from the upper face of each of such plates onto the upper face of the next lower plate, while simultaneously passing a stream of the gas through the perforations of the respective plates in upward direction at a pressure and in a quantity sufficient to prevent downward flow of the flowable mass through such perforations and also sufficient to cause reaction of the flowable mass with the upwardly streaming gas while the same contacts the flowable mass flowing along the tortuous paths on the upper faces of the perforated plates.

CROSS-REFERENCES TO RELATED APPLICATIONS

The present application is a divisional application of my copending application Ser. No. 524,261, Group 120, filed Feb. 1, 1966, now Patent No. 3,497,327, and entitled "Method and Apparatus for Continuous Hydrogenation of Oils and Fats."

BACKGROUND OF THE INVENTION

After W. Normann introduced the catalytic hydrogenation of oils and fats, it was repeatedly attempted to carry out this method in a continuous manner. Certain processes were suggested which utilize for continuous hydrogenation a plurality of autoclaves equipped with stirrers, whereby the oil which is to be hardened, i.e., hydrogenated, with the catalyst dispersed therethrough, passes sequentially through a series of such autoclaves while simultaneously hydrogen gas is blown from below into each of the autoclaves, so that the hydrogen gas passes in the form of small gas bubbles through the oil-catalyst mixture. It also has been proposed to use a single autoclave containing several compartments through which the oil-catalyst mixture will pass in sequence, whereby each of the compartments is equipped with suitable pumping devices for remixing the oil-catalyst suspension with hydrogen gas. Other known devices operate with fixed catalysts, along which runs, in the presence of hydrogen gas, the oil which is to be hardened, somewhat in the manner of passage through a wash column.

In the production of partially hydrogenated vegetable or animal fats for nutrition purposes, it is desirable to carry out a selective hydrogenation. In this case, selective hydrogenation means that, in a stepwise manner, at first molecules containing several double-bonds are partially hydrogenated, prior to complete saturation of the oil or fat to saturated compounds free of double-bonds. Selective hydrogenation will achieve the uniform consistency of the hydrogenated fat or oil which is desired by the ultimate consumer as well as by the intermediate processor. This uniform consistency is simultaneously improved by the formation of the iso acids which takes place during the selective hydrogenation.

In discontinuous batch-wise hydrogenation methods which are generally in use, selective hydrogenation is accomplished by proper adjustment of the reaction conditions such as the hydrogen gas pressure, the temperature, and the amount and the activity of the catalyst. In principle, similar adjustments are possible in a continuous hydrogenation process, however, only under the assumption that, like in a batch process, all oil particles will be exposed to equal chances of reacting with hydrogen.

In other words, the residence time of all oil particles in the reaction vessel or hydrogenation space must be approximately the same. All of the so far proposed continuous hardening or hydrogenation processes are connected with the disadvantage that it is by no means possible to provide for substantially the same length of residence time for all oil particles. Thus, these prior art continuous processes will result in an inhomogeneous or unselectively hardened fat or oil even if reaction conditions are maintained which in a batch process would permit to obtain a selectively hydrogenated and homogeneous product. In the continuous processes, the particles which are maintained in the apparatus for too long a period of time will be hydrogenated up to complete saturation of all double bonds, whereas the particles which pass through the apparatus too quickly will not be hydrogenated or will be hydrogenated only to a small degree. The final product will then consist of an inhomogeneous mixture of an oil or fat the particles of which are hardened or hydrogenated to varying degrees and, consequently, the thus obtained product will be of an undesirable, uneven consistency. Conventionally, the known continuous hydrogenation processes use cascade arrangements, including between 3 and 5 steps. However, the residence time of the individual fat or oil particles will vary over a wide range. A somewhat even distribution of residence times could be expected with cascade arrangements of this type only if the number of steps would be increased to between about 30 and 50. Similarly, unfavorable results are achieved with arrangements containing a stationary catalyst arranged in the manner of a scrubbing tower or wash column. It has been found that such arrangements, with respect to the distribution of residence times of the individual oil or fat particles, are not better than cascade arrangements with 3 to 5 steps. Due to the uneven residence times of the individual oil particles or the like it has not been possible to obtain a satisfactory selective hydrogenation with the apparatus and arrangements suggested up to now.

It is therefore an object of the present invention to overcome the above discussed difficulties and disadvantages.

It is a further object of the present invention to provide a method which will permit carrying out of selective hydrogenation of oils, fats and the like in a simple and economical manner and so as to obtain a uniformly hydrogenated product of the desired uniform consistency.

SUMMARY OF THE INVENTION

The present invention proposes to react a flowable mass with a gas adapted to react therewith by passing the flowable mass along tortuous paths along upper faces of a series of vertically spaced substantially horizontally extending perforated plates and from the upper face of each of the plates onto the upper face of the next lower plate, and simultaneously passing a stream of gas, adapted to react with the flowable mass, through the perforation of the perforated plates successively from below the lowermost plate to above the uppermost plate at a pressure and in a quantity sufficient to prevent downward flow of the flowable mass through the perforations and to cause reaction of the flowable mass with the gas while the flowable mass flows along the tortuous path.

The flowable mass may consist of a mixture including an unsaturated organic compound and a hydrogenation catalyst capable, in the presence of hydrogen, to cause hydrogenation of the unsaturated compound, and the gas may consist at least partly of free hydrogen gas. Preferably, the method is carried out in a continuous manner and the unsaturated organic compound may be fat or oil, and the hydrogenation catalyst may be a nickel, platinum or palladium catalyst.

The novel features which are characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a cross sectional elevational view through a reaction vessel or column for hydrogenating fats, oils or the like according to the present invention;

FIG. 3 is a cross-sectional view taken along line A–B of FIG. 2, showing particularly the tortuous path and the guide means which define the tortuous path on a perforated plate;

FIG. 4 is a schematic elevational view in cross section of another embodiment of the bottom portion of the hydrogenating column; and FIG. 5 is a cross sectional view taken along line C–D of FIG. 4.

DESCRIPTION OF THE PREFERRED EMBODIMENTS

Figure 1:
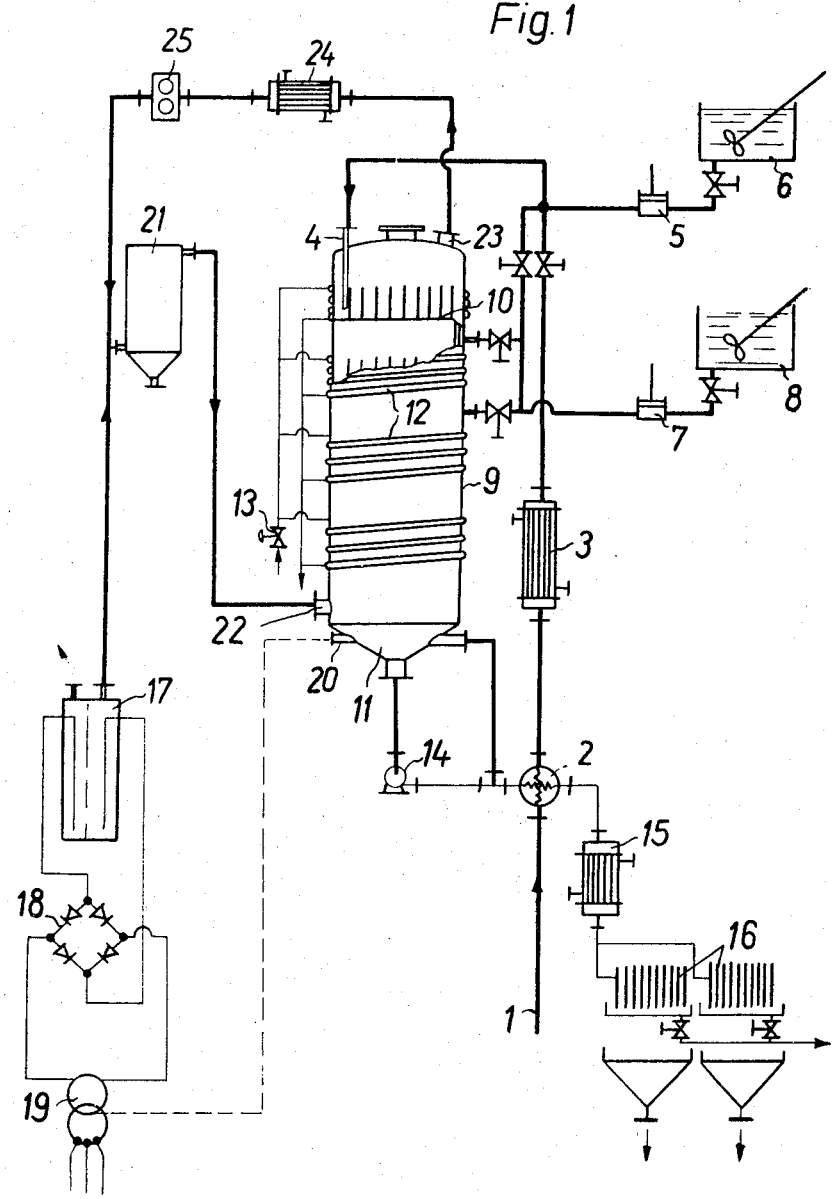
FIG. 1 is a schematic elevational view of an entire arrangement according to the present invention.

The present invention is thus concerned with a method of reacting a flowable mass with a gas adapted to react therewith, comprising the steps of passing the flowable mass along tortuous paths along upper faces of a series of vertically spaced substantially horizontally extending perforated plates and from the upper face of each of the plates onto the upper face of the next lower plate, and simultaneously passing a stream of gas, adapted to react with the flowable mass, through the perforations of the perforated plates successively from below the lowermost plate to above the uppermost plate at a pressure and in a quantity sufficient to prevent downward flow of the flowable mass through the perforations and to cause reaction of the flowable mass with the gas while the flowable mass flows along the tortuous path.

According to a preferred embodiment, the present invention is primarily concerned with the hydrogenation of a flowable mass consisting of a fat or oil which is to be hydrogenated and which has solid hydrogenation catalyst particles distributed therethrough, by contact of such flowable mass with hydrogen gas or with a gas containing free hydrogen gas, in the manner indicated above.

An essential feature of the method of the present invention is thus the successive passing of oil or fat, in the presence of a catalyst dispersed therein, along a series of perforated bottoms which are arranged in a column, vertically spaced from each other, in such a manner that the flowable mass consisting of the oil, fat or the like with the catalyst dispersed therein will pass along the upper face of each of the perforated bottoms along a tortuous path which is enforced by suitably arranged guide means on the upper face of the respective perforated sheet or plate forming the perforated bottom. The flowable mass passes successively in downward direction over the upper faces of a series of such perforated plates, along a sequence of meandering or tortuous paths so as to increase the time required for a given portion of the flowable mass to pass along the surface of any one of the perforated plates. Simultaneously, hydrogen gas is circulated through the column defined by the superposed perforated plates. The hydrogen gas passes upwardly through the perforations of the individual perforated plates and thereby prevents downward flow of the flowable mass through these perforations. Thus, the flowable mass will be forced to flow along the tortuous path on each of the perforated plates in downward direction from one plate to the next lower plate and so on, while the hydrogen gas will flow upwardly through the perforations, more or less in countercurrent to the flowable mass of catalyst containing oil, fat or the like.

The hydrogen gas is supplied in excess of the amount required for hydrogenation of the oil or fat or the like, so that sufficient gas pressure will be maintained in the perforations of the respective plates, notwithstanding the consumption of some hydrogen gas for hydrogenation of the oil or fat.

The process of the present invention is particularly advantageous, inasmuch as by proceeding in accordance therewith it is for the first time possible, due to the completely uniform hydrogen gas consumption, to introduce hydrogen gas which is produced by electrolysis under pressure, directly from the electrolytic hydrogen gas-producing apparatus into the hydrogenation device or reaction vessel, without requiring any intermediate storing of the hydrogen gas. Furthermore, the supply of electric energy to the electrolytic apparatus, such as a conventional electrolyzer, and thus the amount and pressure of hydrogen gas produced therein, can be automatically controlled corresponding to the desired gas pressure in the hydrogenation apparatus or column, so that in a continuous manner exactly the amount of hydrogen gas will be produced in the electrolytic apparatus which corresponds to the prevailing hydrogen gas consumption in the directly connected hydrogenation column.

Referring now to the drawing, and particularly to FIG. 1, it will be first described how an oil which is to be hydrogenated passes through the reaction vessel or hydrogenating column.

The fresh oil or the like which is to be hydrogenated is introduced into the apparatus through conduit 1 and passes through indirect heat exchanger 2 in which it is heated by indirect heat exchange with hydrogenated fat or oil which has been withdrawn from the hydrogenating column or vessel. The fresh oil or the like then passes through preheater 3 in which it is sufficiently heated so that the hardening process may start. A suspension of previously used catalyst is then introduced from container 6, which is equipped with a suitable stirrer, by way of dosimetric pump 5 into the stream of oil, or a suspension of fresh catalyst in oil is introduced into the stream of oil from container 8 by way of dosimetric pump 7. The thus formed suspension of solid, subdivided catalyst in oil is introduced through conduit 4 into the reaction vessel or hydrogenation column. Within hydrogenation column 9, the oil passes over all of the perforated plates 10 which subdivide the hydrogenation column into a series of closed chambers and, while the oil-catalyst mixture passes along a tortuous path over the upper faces of the superposed perforated plates, hydrogen is bubbling through the stream of oil-catalyst mixture flowing along the respective upper surfaces of the perforated plates. Hydrogenation of the oil is completed when the same passes downwardly from the lowermost perforated plate and the thus produced hard fat or hydrogenated product collects in sump 11 of column 9. The reaction heat which is freed during hydrogenation is partly removed by cooling the side wall of column 9 by means of cooling pipes 12 arranged on the outer face of the side wall of column 9, i.e., by passing a suitable cooling fluid through pipes or conduits 12. The amount of cooling water which is required for this purpose is controlled in a manner known per se by a temperature controlled device 12 so that the temperature of the column will remain constantly at the desired level.

The hardened fat, oil or the like collecting in sump 11 is passed by means of pump 14 through heat exchanger 2 and cooler 15 into a conventional filtering device 16, indicated in FIG. 1 as a pair of filter presses. Preferably, filtering devices which operate in a continuous or semi-continuous manner are used for this purpose, whereby the used and partially spent catalyst will be recovered in the form of a thick suspension. The thus separated catalyst suspension passes from filtering device 16 to container 6 and/or 8 and from there, at least partly, again into the stream of fresh oil which is to be introduced into the hydrogenation column 9.

The hydrogen gas required for the hydrogenation is produced in a conventional electrolytic device 17, preferably a pressure electrolyzer, for producing hydrogen gas pressures of between about 1 and 10 atmospheres above atmospheric pressure. Electric energy is supplied to electrolyzer 17 by means of rectifier 18 and transformer 19. According to a preferred embodiment of the present invention, the supply of energy to electrolyzer 17 is controlled by a control device 20 which is actuated by the pressure within reaction chamber or hydrogenation column 9, in such a manner that an unchanging, constant pressure will be maintained in reaction vessel 9. This means that at any given moment the amount of hydrogen gas produced in the electrolyzer corresponds to the concurrent consumption of hydrogen gas in reaction vessel 9. Thus, contrary to conventional arrangements, it is not necessary to provide for intermediate storage of the hydrogen gas between production of the same and introduction thereof into the reaction chamber 9. This results in a considerable reduction in the initial investment. The hydrogen gas produced in electrolyzer 17 passes through dryer 21, in which traces of water are removed therefrom, into the lower portion of reaction vessel 9, through inlet 22 thereof and, as will be shown in more detail in FIGS. 2–5, then passes upwardly through the perforations 26 of the respective perforated plates 10 and the flowing oil-catalyst layers on the upper faces of the perforated plates. The hydrogen gas bubbling through the oil-catalyst mixture is partially bound, i.e., consumed by hydrogenation of the oil, and the excess hydrogen gas leaves reaction vessel 9 through outlet 23. The surplus hydrogen gas passes through cooler 24 in which the reaction heat absorbed by the hydrogen gas during passage through the oil layers is withdrawn and the thus cooled hydrogen gas is then compressed in compressor 25 to the pressure of introduction of hydrogen gas at inlet 22. The compressed hydrogen gas is then combined with the freshly produced hydrogen gas and together therewith reintroduced into reaction vessel 9 through inlet 22.

Preferably, the compressed hydrogen gas coming from compressor 25 and the newly produced hydrogen gas are jointly introduced into dryer 21 and from there passed to inlet 22. The ratio of recirculating hydrogen gas to freshly produced hydrogen gas is determined by the consideration that the speed of hydrogen gas passing through the perforations 26 of the uppermost perforated plate 10 must be sufficiently high so that the flowing mass or catalyst-containing fat, oil or the like cannot penetrate through the perforations. Preferably, the ratio will be between 3:1 and 10:1. In special cases it may be advantageous to operate with a lower hydrogen gas pressure namely so that the hydrogen gas pressure in the perforation of the uppermost or several upper perforated plates is not sufficient to prevent a downward flowing of oil-catalyst mixture through perforation 26 of the respective perforated plate 10. In such cases, it is possible to introduce into reaction vessel 9 once, preferably at the beginning of the process, a certain amount of inert gas which will dilute the circulating hydrogen gas so that a higher total pressure but a lower hydrogen gas partial pressure will prevail.

The conditions which are required to achieve the desired degree of hardening or hydrogenation, as well as to achieve the desired selectivity of hydrogenation, can be easily adjusted, by changing the activity or the amount of the catalyst and/or the temperature and the pressure prevailing in the reaction vessel 9.

Referring now to FIG. 2 in which the reaction vessel or hardening column 9 is shown in more detail, particularly with respect to the perforated plates built into the same, it will be seen that the oil to which finely subdivided catalyst has been admixed is introduced into column 9, through inlet conduit 4 and passes successively over the perforated plates 10 which are arranged in vertically spaced relationship within column 9 so as to subdivide column 9 into a series of superposed closed chambers which communicate with each other only through perforations 26 and conduits 29. Hydrogen gas is introduced into column 9 through inlet 22 and passes in upward direction through the perforations 26 of the superposed perforated plates 10 and through the catalyst-containing fat, oil or the like layers flowing along the upper surface of the superposed perforated plates, respectively. During passage of the hydrogen gas through the oil layers, a portion of the hydrogen gas is consumed, i.e. is used up for hydrogenation of the oil. The amount of hydrogen gas which is introduced through inlet 22 is so chosen that even in the perforations 26 of the uppermost perforated plate 10 the speed of flow or the pressure of the hydrogen gas will still be sufficiently high so that the flowing oil or the like cannot penetrate through perforations 26. The hydrogen gas which has not been bound to oil during hydrogenation of the same is withdrawn through outlet 23 at the top of column 9. The thus hydrogenated oil flows from the lowermost perforated plate 26 into the sump 11 of column 9, and is maintained at a certain level therein by operation of float control 27. It will also be seen that the oil after passing along a tortuous path at the upper surface of any one of perforated plates 26 passes downwardly towards the next lower perforated plate 26 or towards sump 11 through the respective conduit 29.

Float control 27 controls operation of pump 14 so that the amount of oil which is withdrawn from sump 11 will correspond to the amount of oil introduced into the reaction vessel through conduit 4.

FIG. 3 illustrates in a plan view a perforated plate 10 which is particularly suitable for use in accordance with the present invention. As compared with a perforated plate of the type which is utilized in rectification or wash columns, perforated plate 10 has only relatively few perforations 26 of small diameter through which hydrogen gas under pressure passes in upward direction. The oil layer on top of each of the perforated plates, for instance, may have a height of between 300 and 1,000 millimeters and is prevented from flowing downwardly through the perforations by the hydrogen gas which bubbles upwardly through the same. The oil or the like which is to be hardened and which is intimately mixed with the dispersed catalyst is introduced through conduit 4 onto uppermost perforated plate 10 and is forced by guide means or baffle plates 28, which form narrow channels on the surface of perforated plate 10, to flow along the surface of plate 10 in a tortuous path. The height of baffle plates 28 must be greater than the desired height of the oil layer on the respective perforated plate. After completing passage through the narrow channel, the oil is withdrawn from the respective perforated plate surface by flowing over overflow 30 and then passing through pipe 29 downwardly to a point above the surface of the next lower perforated plate.

FIGS. 4 and 5 illustrate another preferred embodiment of perforated plates 10 including baffle plates 31 which are arranged in a helical pattern. In this case, as described above, the oil is introduced through conduit 4 onto uppermost perforated plate 10 and passes through a long helical channel to the center portion of perforated plate 10 from where the oil passes over overflow 32 and pipe 33 toward the next lower perforated plate.

For controlling the temperature within reaction chamber 9, i.e., either for heating of the same or for withdrawing reaction heat therefrom, cooling conduits 12 are arranged on the outer face of the side wall of reaction vessel 9, particularly at the portions of the side wall which are juxtaposed to the oil layers on top of the respective perforated plates. A suitable heating or cooling fluid is then passed in conventional manner through conduits 12.

Controlling the operation of the electrolyzer so as to produce a hydrogen gas at the desired constant pressure, may be carried out by means of conventional pressure control devices which may either associate with transformer 19 or which in another manner, for instance by controlling the rectifier, will control the amount of electric power introduced into the electrolyzer so that the pressure of the produced hydrogen gas will remain constant at the desired level.

The electrolyzers which are utilized according to the present invention are conventional devices well known to those skilled in the art. However, broadly, the present invention with respect to the manner in which the oil and hydrogen gas are reacted with each other may also be carried out with hydrogen gas from another source such as a storage container, or with hydrogen gas which is produced by a non-electrolytic process.

The conditions under which selective or unselective hardening of hardenable oils and fats and the like is obtained are well known to those skilled in the art and described, for instance in publications and textbooks by Baily, Kaufmann, Rudischer and Luecke.

The catalysts which are utilized according to the present invention are those which are conventionally used for hydrogenation of oils such as commercially available nickel catalysts, or platinum or palladium catalysts. The oil or fat which is to be hydrogenated may be any oil or fat which can be subjected to hydrogenation, and the final product may be of any desired degree of hydrogenation.

For instance, if stearic acid with an iodine number of below one is to be produced from a mixture of saturated and unsaturated fatty acids with 18 carbon atoms, temperatures of the magnitude of 250° C., gauge pressures of up to 25 atmospheres and relatively large amounts of catalysts will have to be utilized.

On the other hand, if for instance, by slight hydrogenation the iodine number of illipe fat is to be lowered by 1–2 units and in this manner a substitute for cocoa butter is to be produced, then the pressure in the hardening or hydrogenating column or reaction vessel may be as little as between 0.5 and 1 atmosphere above atmospheric pressure, the hardening temperature as low as between 160 and 180° C., and relatively small amounts of catalysts of low activity may be used.

In most conventional hardening processes for producing the starting materials for the margarine and shortening industry, pressures of between 2 and 3 atmospheres above atmospheric pressure, temperatures of between 210 and 230° C. and commercially available carrier-nickel catalysts are utilized.

Without further analysis, the following will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims:

1. Method for continuous hydrogenation of fats and oils, comprising the steps of continuously passing a flowable mass comprising at least one substance selected from the group consisting of fats and oil and of a solid hydrogenation catalyst adapted in the presence of hydrogen to hydrogenate said substance along a tortuous path on each of the upper faces of a series of vertically spaced substantially horizontally extending perforated plates and from the upper face of each of said plates onto the upper face of the next lower plate without passing through said perforations on said plates; and simultaneously passing a stream of a gas consisting at least partly of free hydrogen, through the perforations of said perforated plates successively from below the lowermost plate to above the uppermost plate at a pressure and in a quantity sufficient to prevent downward flow of said flowable mass through said perforations and to cause reaction of said flowable mass with said gas while said flowable mass flows along said tortuous paths on the upper face of each of said series of vertically spaced substantially horizontally extending perforated plates.

2. Method for continuous hydrogenation as defined in claim 1, wherein said gas is a mixture of free hydrogen gas and at least one gas which is inert with respect to said flowable mass.

3. Method for continuous hydrogenation as defined in claim 1, and comprising the steps of withdrawing the reacted flowable mass; allowing the solid catalyst therein to settle so as to form a suspension of increased catalyst content; mixing the thus formed suspension of increased catalyst content with an unreacted substance; passing the thus formed flowable mass along said tortuous path starting at the upper face of the uppermost of said perforated plates; and passing a flowable mass formed of said substance and fresh catalyst along said tortuous path starting at the upper face of a perforated plate below said uppermost of said perforated plates.

4. Method for continuous hydrogenation as defined in claim 1, wherein said stream of gas is passed upwardly through the perforations of said plates at a pressure sufficient to reliably prevent downward passage of flowable mass through the perforations of the uppermost of said perforated plates.

5. Method for continuous hydrogenation as defined in claim 1, wherein said hydrogenation catalyst is a nickel, platinum or palladium catalyst.

References Cited
UNITED STATES PATENTS 2,762,819   9/1956   Bollens _____ 260—409

FOREIGN PATENTS 828,883   2/1938   France _____ 260—409
1,009,749   6/1957   Germany _____ 260—409

LEWIS GOTTS, Primary Examiner

C. L. MILLS, Assistant Examiner

U.S. Cl. X.R.

260—690